United States Patent [19]

Honda

[11] Patent Number: 4,977,587

[45] Date of Patent: Dec. 11, 1990

[54] X-RAY IMAGE PROCESSING APPARATUS

[75] Inventor: Michitaka Honda, Nishinasunomachi, Japan

[73] Assignee: Kabushiki Kaisha Toshiba, Kawasaki, Japan

[21] Appl. No.: 512,512

[22] Filed: Apr. 19, 1990

Related U.S. Application Data

[63] Continuation of Ser. No. 236,750, Aug. 26, 1988, abandoned.

[30] Foreign Application Priority Data

Aug. 28, 1987 [JP] Japan .................................. 62-214734

[51] Int. Cl.$^5$ .............................................. H05G 1/64
[52] U.S. Cl. .......................................... 378/99; 378/95
[58] Field of Search ...................... 378/95, 99; 358/111

[56] References Cited

U.S. PATENT DOCUMENTS

| | | | |
|---|---|---|---|
| 4,185,198 | 1/1980 | Fujimoto | 358/111 |
| 4,204,226 | 5/1980 | Mistretta et al. | 378/99 |
| 4,504,858 | 3/1985 | Franke . | |
| 4,543,604 | 9/1985 | Grosse | 378/99 |
| 4,551,800 | 11/1985 | Riederer et al. | 378/99 |
| 4,618,976 | 10/1986 | Haendle | 358/111 |
| 4,689,670 | 8/1987 | Okazaki | 358/111 |
| 4,709,385 | 11/1987 | Pfeiler et al. | 378/95 |

Primary Examiner—Craig E. Church
Attorney, Agent, or Firm—Oblon, Spivak, McClelland, Maier & Neustadt

[57] ABSTRACT

The fluoroscopic signal is supplied to A/D converter and converted into a digital signal. The digital signal is input to selection circuit, memory and display control circuit. Selection circuit detects the brightness of each frame of the fluoroscopic signal and comprises accumulator, reference register, comparator, and AND gate. Accumulator accumulates digital signal of each frame, and detects the brightness of each frame. Register multiplies the brightness of any frame of image formed before the injection of a contrast medium into the blood vessel, with a suitable coefficient, and holds the product as a reference value. Comparator compares the reference value with the output data of accumulator. A trigger signal is externally input to AND gate, and the output of accumulator is supplied to AND gate. When the output of comparator is not less than the reference value, the comparator outputs the detection signal and the write-enable terminal WE of memory rises to a high level. Then, the fluoroscopic signal output by A/D converter is written into memory. When the output of accumulator becomes less than the reference value, the output of comparator falls to a low level, whereby the data writing is stopped and the frames are read from memory. Display control circuit superposes the fluoroscopic signal read from memory, with the fluoroscopic signal output by A/D converter in real time, and displays the superposed signals on display.

14 Claims, 3 Drawing Sheets

X-RAY IMAGE PROCESSING APPARATUS

This application is a continuation of application Ser. No. 236,750, filed on Aug. 26, 1988, now abandoned.

BACKGROUND OF THE INVENTION

1. Field of the Invention

The present invention relates to an X-ray image processing apparatus for processing X-ray images of a subject which have been formed by an X ray diagnosis apparatus.

2. Description of the Related Art

During a medical treatment, a catheter is often inserted into a blood vessel existing in the region of interest of a patient. Seeing the X-ray image of the region of interest, the doctor inserts the catheter, deeper into the blood vessel. The blood vessel is not seen in the X-ray image. To form an image of the vessel, a contrast medium is applied in a small amount from the catheter into the blood vessel, so that the image of the blood vessel appears in the X ray image.

Since the amount of the contrast medium applied into the blood vessel is so small that the image of the blood vessel disappears within a very short time. The data representing the image, which lasts for an extremely short time after the contrast medium has been applied into the blood vessel, is written into a memory. Whenever necessary, this data is read from the memory, and the image of the blood vessel is superposed on the X-ray image of the region of interest.

Usually it is the doctor who applies the contrast medium into the blood vessel, and whereas it is usually the doctor's assistant who pushes or operates the switch for writing the image data into the memory. The assistant must operate the switch the very moment the image of the blood vessel is formed by virtue of the contrast medium, so that the data is written into the memory. It is difficult for the assistant to operate the switch at a desired time. If the assistant operates the switch either too early or too late, no image data can be written into the memory. For the doctor it is impossible to both inject the medium into the vessel and operate the switch, within said extremely short time. Therefore, the doctor cannot help but assign the operation of the switch to the assistant, and as a consequence, the data representing the image of the blood vessel cannot be written into the memory in some cases.

SUMMARY OF THE INVENTION

It is accordingly the object of the present invention to provide an X-ray image processing apparatus which can reliably write the data representing the image of a blood vessel into a memory.

According to the invention, there is provided an X-ray image processing apparatus which comprises a data-accumulating circuit for determining the brightness of every frame of an X-ray image, from the X-ray image signals externally supplied; a comparator for detecting the appearance of an image of a blood vessel, from the output from the data-accumulating circuit; and a memory into which the X-ray image signals are written at the time the comparator detects the appearance of the blood vessel image.

DETAILED DESCRIPTION OF THE PREFERRED EMBODIMENTS

Figure 1:
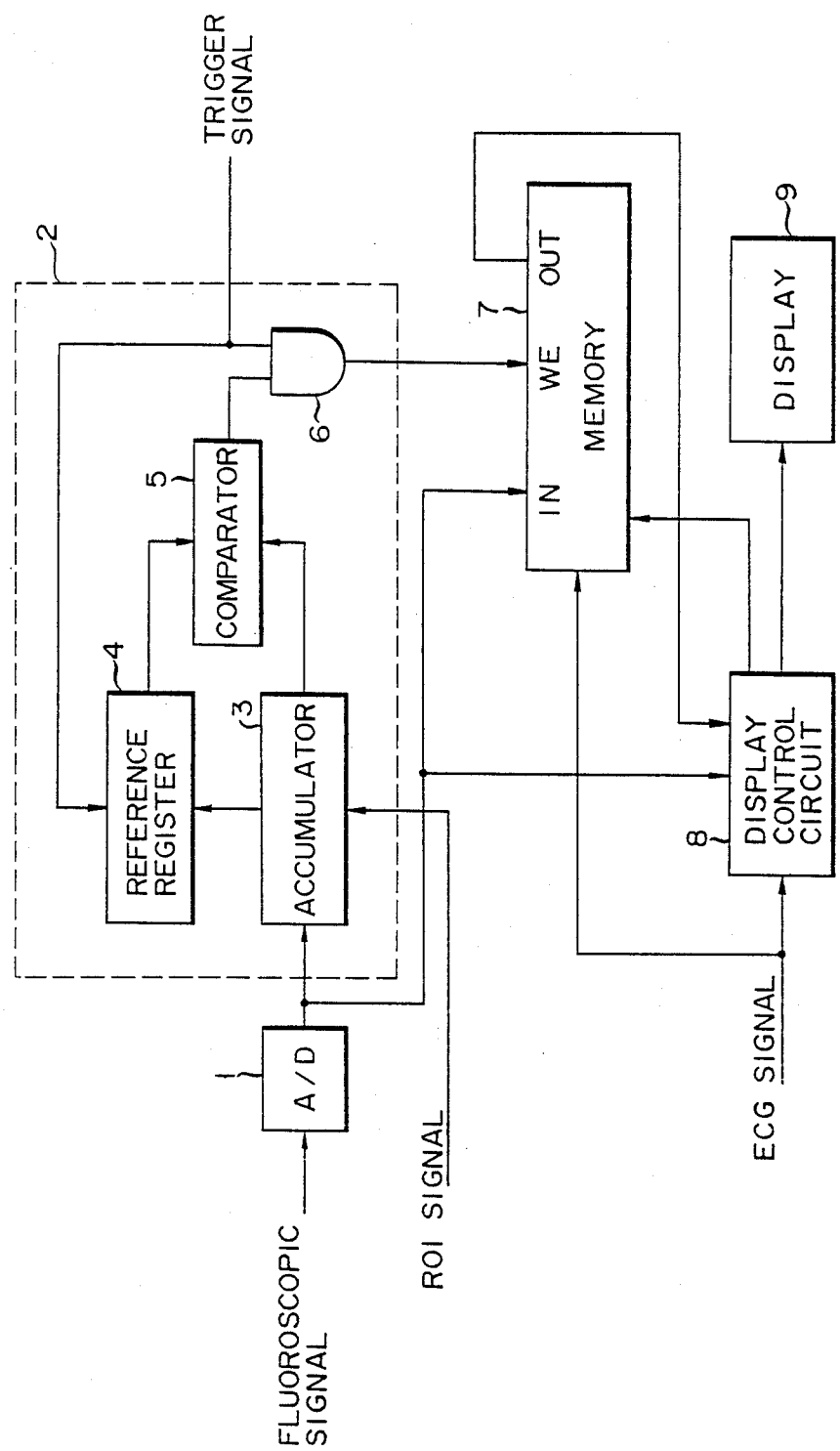
FIG. 1 is a block diagram showing an embodiment of an X-ray image processing apparatus according to the present invention.

FIG. 1 schematically illustrates the embodiment of an X-ray image processing apparatus according to the present invention. The fluoroscopic signal, which has been generated by an X-ray diagnosis apparatus (not shown) and represents the image of a region of interest (ROI) of a patient, is supplied to A/D converter 1. A/D converter 1 converts the input signal into a digital fluoroscopic signal. The digital signal is supplied to selection circuit 2, memory 7, and display control circuit 8. Selection circuit 2 detects the brightness of each frame of the X-ray image represented by the digital signal. Any frame showing the image of a blood vessel and the image of the ROI has a brightness different from the frames showing only the image of the ROI. Hence, selection circuit 2 can identify a frame or frames showing the image of any blood vessel. Since circuit 2 detects the brightness of each frame in real time, it detects the very moment the image of the blood vessel appears in the ROI image. When selection circuit 2 detects the appearance of the blood vessel image in the ROI image, it outputs a detection signal. The detection signal is supplied to the write-enable terminal WE of memory 7.

Selection circuit 2 comprises accumulator 3, reference register 4, comparator 5, and AND gate 6. Accumulator 3 accumulates the digital fluoroscopic signal forming each frame, which has been supplied from A/D converter 1, thereby to measure the brightness of the every frame. Reference register 4 multiplies the brightness of any frame of image formed before the application of the contrast medium into the blood vessel, with a suitable coefficient, and holds the product of the multiplication as a reference value. Comparator 5 compares the value output by accumulator 3 representing the brightness of the every frame with the reference value output by reference register 4. AND gate 6 is triggered by a trigger signal externally input to selection circuit 2, thereby to supply the output signal of comparator 5 to the write-enable terminal WE of memory 7. Accumulator 3 can accumulate only the fluoroscopic signal corresponding to the pixels forming the image of the ROI. To cause accumulator 3 to accumulate only such fluoroscopic signal, a ROI signal is supplied to accumulator 3. When accumulator 3 accumulates exclusively such fluoroscopic signal, the appearance of the blood vessel image can be detected more precisely.

When the signal output by comparator 5 passed through AND gate 6 enables memory 7 to write data, the fluoroscopic signal supplied from A/D converter 1 to the data input terminal IN of memory 7 is started to be written into memory 7. As long as no signals are supplied to the terminal WE, memory 7 keeps outputting its contents repeatedly.

In the case where the heart of a patient is being X-ray photographed, not only the fluoroscopic signal but also electrocardiographic (ECG) signal are supplied to memory 7. The ECG signal will be used as phase signals representing the motion of the X-ray image. Hence, the ECG signal is written into memory 7, along with the X-ray image with a blood vessel image.

The data read from memory 7 is supplied to display control circuit 8. The ECG signal is also input to display control circuit 8. In response to the ECG signal, each frame of the stored X-ray image is read from memory 7 to display control circuit 8. Display control circuit 8 superpose the fluoroscopic signal read from memory 7 on the fluoroscopic signal which has been generated in real time and supplied from A/D converter 1. The superposed fluoroscopic signal is supplied to display 9. Therefore, display 9 displays an image of the heart, which is the superposition of the image defined by the fluoroscopic signal read from memory 7 and the image defined by the real-time X-ray image signal.

In operation, as the X-ray photographing of the heart proceeds, the X-ray diagnosis apparatus (not shown) generates a fluoroscopic signal. The signal is supplied to A/D converter 1 and converted into digital fluoroscopic signal. The digital signal is supplied to display control circuit 8. Since no signals have been written into memory 7, display 9 displays only the X-ray image of the heart in real time.

Before injecting the contrast medium into the blood vessel, the doctor or the assistant operates a trigger switch (not shown), thus supplying a trigger signal to the first input terminal of AND gate 6. The trigger signal is also supplied to reference register 4. In response to the trigger signal, reference register 4 holds, as a reference value, the data accumulated in accumulator 3 or a value little greater than the data accumulated in accumulator 3. It suffices to generate the trigger signal, which enables AND gate 6 to pass the output of comparator 5, at any time before the contrast medium is injected into the blood vessel. Unlike in the conventional X-ray image processing apparatus, so much care need not be taken to operate the trigger switch with good timing.

Figure 2:
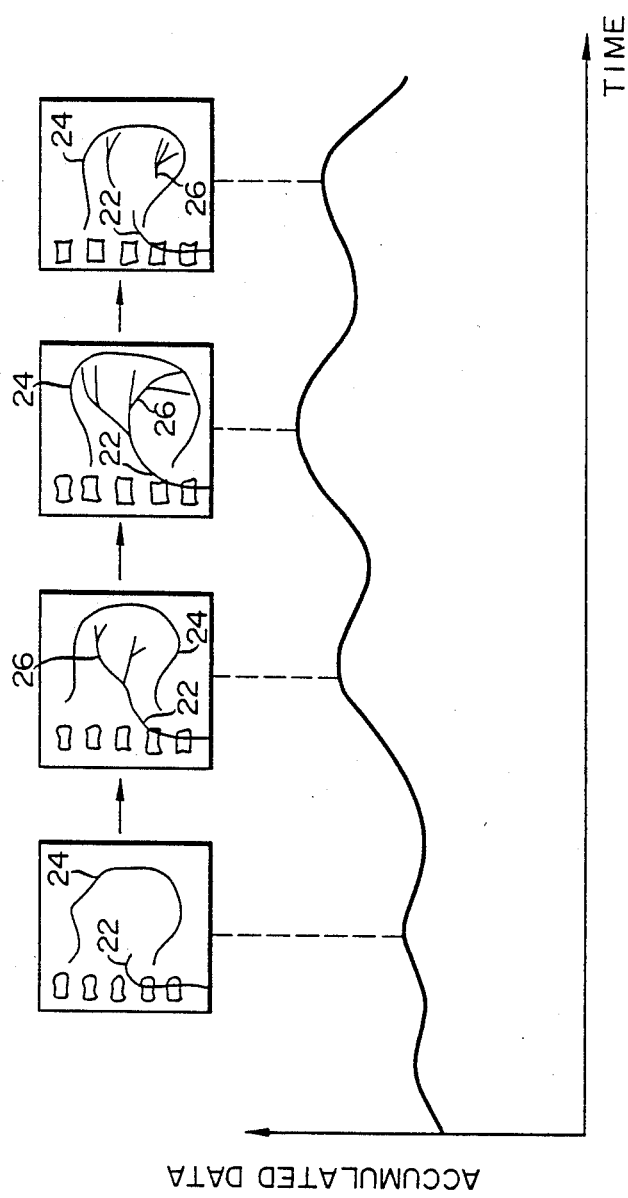
FIG. 2 is a diagram showing various data items which the accumulator outputs as time passes, and therefore explaining how the apparatus shown in FIG. 1 operates.

Once the reference value has been set in reference register 4, comparator 5 compares the frame accumulated values sequentially output from accumulator 3 with the reference value. As is shown in FIG. 2, the value accumulated in accumulator 3 increases when an image of the blood vessel appears in the X-ray image of the heart, by virtue of the contrast image. Therefore, the appearance of the image of the blood vessel can be detected by comparing the value output by accumulator 3 with the reference value. Four images of the heart, which are formed from the four different values output from accumulator 3, are shown in FIG. 2. In FIG. 2, numeral 22 designates the image of a catheter; numeral 24 shows the profile of the heart; and numeral 26 denotes the image of the blood vessel.

When comparator 5 detects that the value output by accumulator 3 is greater than the reference value, it generates a detection signal at a "1" level. The detection signal is supplied to the second input terminal of AND gate 6. Since the trigger signal has been supplied to the first input terminal of AND gate 6, AND gate 6 produces an output signal at the "1" level. This signal is supplied to the write-enable terminal WE of memory 7. As a result, memory 7 starts storing the digital fluoroscopic signal supplied from A/D converter 1. Memory 7 has a capacity of tens of image frames.

As time passes after the contrast medium has been injected into the blood vessel, the image of the blood vessel becomes less visible. The less visible this image, the less the value accumulated in accumulator 3. When the value output from in accumulator 3 becomes less than the reference value, the output signal of comparator 5 falls from the "1" level to the "0" level. As a result of this, the write-enable signal WE also falls to the "0" level, whereby, the writing of data into memory 7 is stopped.

Alternatively, the writing of data into memory 7 can be automatically stopped upon lapse of a predetermined period after the detection of the appearance of the blood vessel image. This period is, for example, n times one pulsation period, where n is an integer greater than one.

Hence, a plurality of frames of the heart image, including frames showing the image of the blood vessel, have been written into memory 7. Along with these frames, the ECG signal corresponding to these frames, has also been written into memory 7.

When the output signal of comparator 5 falls to the "0" level, and the write-enable signal WE consequently falls to the "0" level, memory 7 is set to data-reading mode. As a result, the frames of the image are sequentially read out of memory 7 in synchronism with the ECG signal. The frames, thus read, are supplied to display control circuit 8. Circuit 8 superposes these frames on the real-time frames output by A/D converter 1. Since each frame read from memory 7 shows the heart in the same phase of motion as the heart shown in the corresponding frame output by A/D converter 1, the resultant superposed image of the heart is clear, not blurring.

As has been described, the embodiment of the invention can detect an image of the blood vessel appearing in the image of the ROI, in accordance with the brightness of each frame of the ROI image. Upon detecting the image of the blood vessel, the writing of the fluoroscopic signal into memory 7 is automatically started. Thus, the data representing the blood vessel image is written into memory 7 without fail, unlike in the conventional case where the doctor or the assistant operates a switch to start the writing of X-ray image data into a memory. Although the actual image of the blood vessel disappears within a very short time from the image of the ROI, display 9 displays the blood vessel since display control circuit 8 superposes the frame showing the blood vessel, which has been read from memory 7, on the real-time frame of the same phase, which has been output by A/D converter 1. The image of the blood vessel, thus displayed, helps the doctor to guide the catheter into the blood vessel.

The present invention is not limited to the embodiment described above. Various changes and modifications can be made without departing the scope of the invention. Some modifications will be described.

First, according to the invention, the doctor or the assistant can operate display control circuit 8 in such a way as to make display 9 display only the image of the blood vessel, not superposed on an image of the ROI.

Secondly, display control circuit 8 can be designed to properly set the ratio of the density of the realtime frame and the blood vessel superposed. Unless this ratio set is performed, the image of the catheter will look too dark when the frame read from memory 7 is superposed on the real-time frame output by A/D converter 1, since the image of the catheter is included in both frames.

Thirdly, instead of superposing every frame read from memory 7 on the real-time frame output by A/D converter 1, only one of the frames stored in memory 7 can be superposed on the real-time frame. Alternatively, only one of the frames stored in memory 7 can be displayed as a still picture by an additional display.

Fourthly, instead of the X-ray image data output by A/D converter 1, subtraction image data can be written into memory 7. If this is the case, there will be no problem when the image of the blood vessel represented by the data stored in memory 7 is positionally deviated from the real-time X-ray image of the ROI. The subtraction image data need not be ordinary cardiac subtraction image data; it can be subtraction data obtained by subtracting a real-time image from the averaged data of a one-pulsation image data. When such subtraction image data is used, the walls of the heart will be seen moving. Nonetheless, the results will be very similar to those obtained when cardiac subtraction image data is utilized.

Figure 3:
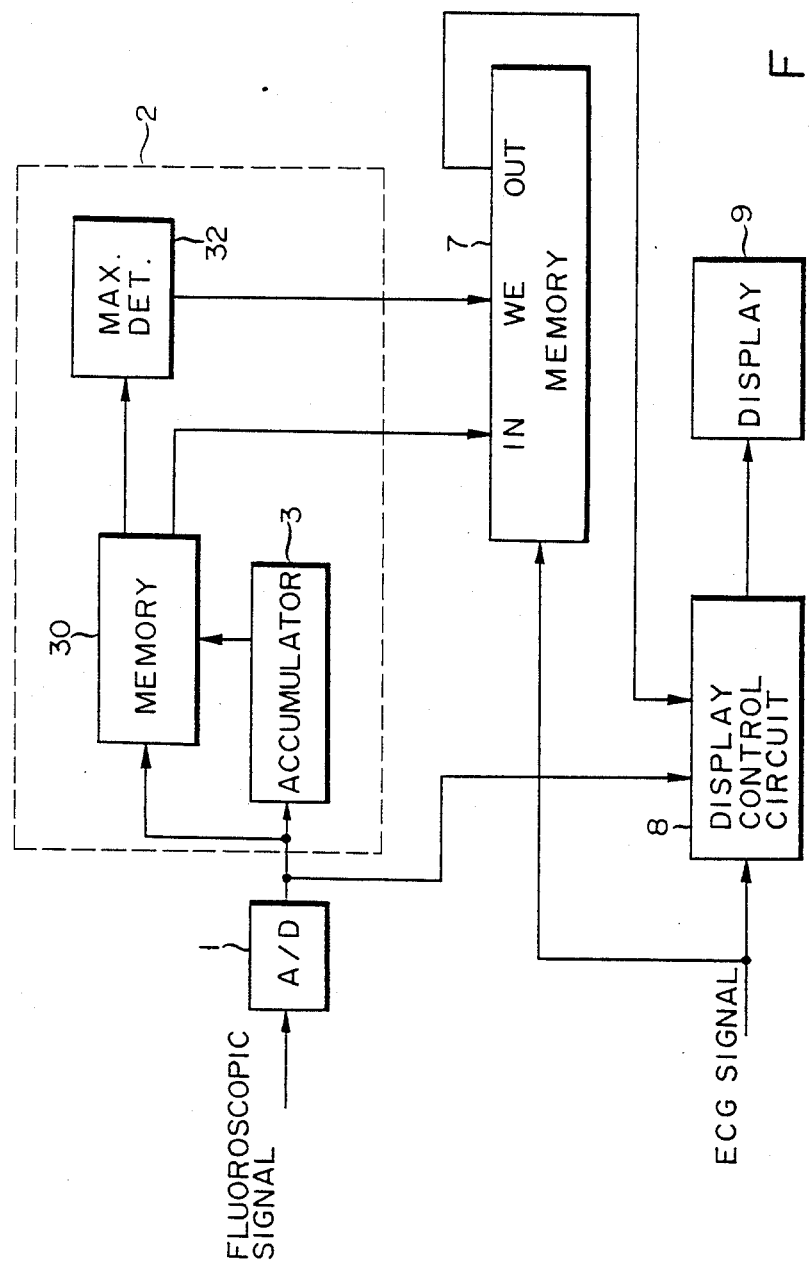
FIG. 3 shows a modification of the X-ray image processing apparatus.

Further, to detect the appearance of the blood vessel image in the image of the ROI, it is possible to continuously write into memory 30 both the output data of A/D converter 1 and the output data of accumulator 3, after the data is overflowed memory 30 updates new output data items supplied from A/D converter 1 and accumulator 3, as shown in FIG. 3. The greatest of all the output values of accumulator 3, which are stored in memory 7 at any time, is detected. A few frames output from A/D converter 1 which have been generated before and after the frame having the greatest value, within the period n times one-pulsation time, are transferred from memory 30 to memory 7. As a result, the data showing the image of the blood vessel is written into memory 7.

Moreover, accumulator 3 can be designed to accumulate not fluoroscopic signal forming every frame, but the cardiac subtraction signal of every frame. In this case, it will be easy to select any desired frame of image, that shows the blood image by virtue of the contrast medium injected into the blood vessel.

What is claimed is:

1. An X-ray image processing apparatus comprising:
    means for detecting the brightness of each frame of an X-ray image which is supplied from an x-ray image apparatus;
    means for comparing the brightness detected with a predetermined level in order to detect, on the basis of the comparison result, a first timing at which a blood vessel image becomes visible due to a contrast medium being injected into the blood vessel and a second timing at which the blood vessel image becomes non-visible;
    first memory means, for storing the frames of an X-ray image supplied from the X-ray image apparatus, during the time period from the first timing to the second timing, the X-ray image having the blood vessel image being written into the first memory means; and
    display means for displaying the X-ray image stored in said first memory means.

2. The X-ray image processing apparatus according to claim 1, in which said detecting means comprises:
    means for detecting the brightness of every frame of the X-ray image; and
    means for comparing the brightness of each frame with a reference value, and generating a detection signal when the brightness of the frame is greater than the reference value.

3. The X-ray image processing apparatus according to claim 2, in which said brightness-detecting means comprises means for accumulating the X-ray image of each frame.

4. The X-ray image processing apparatus according to claim 2, in which said brightness-detecting means comprises means for accumulating the X-ray image of a region of interest of each frame.

5. The X-ray image processing apparatus according to claim 2, in which said brightness-detecting means comprises means for accumulating a cardiac subtraction signal of each frame of the X-ray image of the heart of a patient.

6. The X-ray image processing apparatus according to claim 5, in which said brightness-detecting means comprises means for accumulating the cardiac subtraction signal of each frame of the X-ray image of a region of interest.

7. The X-ray image processing apparatus according to claim 1, in which said display means comprises means for displaying an image defined by the X-ray image signal supplied from the X-ray image apparatus, and also an image defined by the X-ray image signal stored in said first memory means.

8. The X-ray image processing apparatus according to claim 7, in which said display means comprises means for superposedly displaying the images defined by the X-ray image signal supplied from the X-ray image apparatus and by the X-ray image signal stored in said first memory means.

9. The X-ray image processing apparatus according to claim 8, in which said first memory means has means for storing a phase signal representing a movement of an object with the X-ray image signal, and said display means for reading the frames of the X ray image from said first memory means in synchronism with a current phase signal.

10. The X-ray image processing apparatus according to claim 9, in which said phase signal is an electrocardiogram signal.

11. The X-ray image processing apparatus according to claim 1, in which said first memory means comprises means for storing a signal representative of the difference between a mask image and a real image, both being of the same phase, when the X-ray image signal externally supplied from the X-ray image apparatus define an image of the heart.

12. The X-ray image processing apparatus according to claim 1, in which said first memory means comprises means for storing a signal representative of the difference between an average mask image within one-pulsation period and a real image, when the X-ray image signal externally supplied from the X-ray image apparatus defines a image of the heart.

13. The X-ray image processing apparatus according to claim 1, in which said detecting means comprises second memory means for storing every frame of the X-ray image and also data representing the brightness of very frame, and means for detecting the frame having the greatest brightness within the data in said second memory means; and said first memory means comprises means for storing a plurality of frames generated before and after the frame having the greatest brightness.

14. An X-ray image processing apparatus comprising:

means for detecting the brightness of each frame of an X-ray image which is supplied from an X-ray image apparatus;

means for comparing the brightness detected with a predetermined level in order to detect, on the basis of the comparison result, the timing at which a blood vessel image becomes visible due to a contrast medium being injected into the blood vessel;

first memory means for storing the frames of an X-ray image from the X-ray image apparatus during a predetermined period of time following the first timing, the X-ray image having the blood vessel image being written into said first memory means; and display means for displaying the X-ray image stored in said first memory means.

* * * * *